(12) United States Patent
Borrelli et al.

(10) Patent No.: US 11,719,891 B2
(45) Date of Patent: Aug. 8, 2023

(54) METHOD OF MAKING A LENSED CONNECTOR WITH PHOTOSENSITIVE GLASS

(71) Applicant: CORNING RESEARCH & DEVELOPMENT CORPORATION, Corning, NY (US)

(72) Inventors: Nicholas Francis Borrelli, Elmira, NY (US); Davide Domenico Fortusini, Ithaca, NY (US); Yu-Yen Huang, Goleta, CA (US); Shawn Michael O'Malley, Horseheads, NY (US); Georges Roussos, San Jose, CA (US); Joseph Francis Schroeder, III, Lindley, NY (US); Jun Yang, Horseheads, NY (US); Lei Yuan, Painted Post, NY (US)

(73) Assignee: Corning Research & Development Corporation, Corning, NY (US)

( * ) Notice: Subject to any disclaimer, the term of this patent is extended or adjusted under 35 U.S.C. 154(b) by 23 days.

(21) Appl. No.: 17/369,090

(22) Filed: Jul. 7, 2021

(65) Prior Publication Data
US 2022/0043218 A1    Feb. 10, 2022

Related U.S. Application Data

(60) Provisional application No. 63/061,543, filed on Aug. 5, 2020.

(51) Int. Cl.
| | | |
|---|---|---|
| C03B 32/02 | (2006.01) | |
| C03B 19/00 | (2006.01) | |
| C03C 23/00 | (2006.01) | |
| G02B 6/38 | (2006.01) | |
| C03C 27/10 | (2006.01) | |
| C03C 4/04 | (2006.01) | |

(52) U.S. Cl.
CPC ............ *G02B 6/3853* (2013.01); *C03B 19/00* (2013.01); *C03C 4/04* (2013.01); *C03C 23/002* (2013.01); *C03C 27/10* (2013.01); *G02B 6/3854* (2013.01); *G02B 6/3861* (2013.01)

(58) Field of Classification Search
CPC ....... C03B 32/02; C03B 19/00; C03C 23/002; C03C 23/007
See application file for complete search history.

(56) References Cited

U.S. PATENT DOCUMENTS

| | | |
|---|---|---|
| 6,783,920 B2 | 8/2004 | Livingston et al. |
| 6,830,221 B1 | 12/2004 | Janson et al. |
| 6,952,530 B2 | 10/2005 | Helvajian et al. |

(Continued)

FOREIGN PATENT DOCUMENTS

| | | |
|---|---|---|
| DE | 19644758 A1 | 4/1998 |
| DE | 102008007871 A1 | 8/2008 |

(Continued)

OTHER PUBLICATIONS

Borrelli, N.F, Microoptics Technology, Second Edition, 2005, 58 pages.

*Primary Examiner* — Cynthia Szewczyk

(57) ABSTRACT

The present disclosure relates to a method of making a lensed connector in which a glass ferrule has holes within the body of the glass ferrule, and the glass ferrule is subsequently processed to form lens structures along the ferrule.

12 Claims, 13 Drawing Sheets

(56) References Cited

U.S. PATENT DOCUMENTS

| | | | |
|---|---|---|---|
| 8,068,278 B2 | 11/2011 | Janson et al. | |
| 8,873,908 B2 * | 10/2014 | Hu | B23K 26/32 |
| | | | 385/27 |
| 9,073,258 B2 | 7/2015 | Helvajian et al. | |
| 9,433,115 B2 | 8/2016 | Helvajian | |
| 9,446,590 B2 | 9/2016 | Chen et al. | |
| 2004/0067015 A1 * | 4/2004 | Nakajima | G02B 3/0018 |
| | | | 385/33 |
| 2004/0137372 A1 | 7/2004 | Livingston et al. | |
| 2005/0135724 A1 | 6/2005 | Helvajian et al. | |
| 2006/0068629 A1 * | 3/2006 | Nakajima | G02B 6/4249 |
| | | | 439/378 |
| 2009/0073087 A1 | 3/2009 | Janson et al. | |
| 2011/0167941 A1 | 7/2011 | Helvajian | |
| 2013/0265730 A1 | 10/2013 | Helvajian | |
| 2015/0210074 A1 | 7/2015 | Chen et al. | |

FOREIGN PATENT DOCUMENTS

| | | | | |
|---|---|---|---|---|
| EP | 1700406 A2 | 9/2006 | | |
| EP | 2952978 A1 | 12/2015 | | |
| GB | 2398778 A | 9/2004 | | |
| JP | 2000178036 A * | 6/2000 | | C03B 32/02 |
| WO | WO-9735811 A1 * | 10/1997 | | B23K 26/032 |
| WO | WO-2005034594 A1 * | 4/2005 | | C03C 11/005 |
| WO | 2005/061325 A1 | 7/2005 | | |
| WO | 2005/062786 A2 | 7/2005 | | |
| WO | 2014/028022 A1 | 2/2014 | | |
| WO | WO-2018221717 A1 * | 12/2018 | | G02B 3/0056 |

* cited by examiner

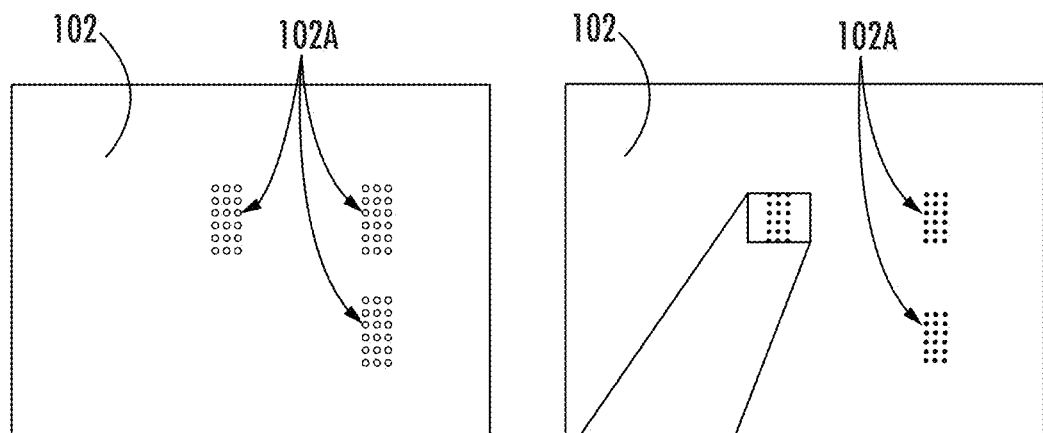
BEFORE FILLING
FIG. 7A
AFTER FILLING
FIG. 7B
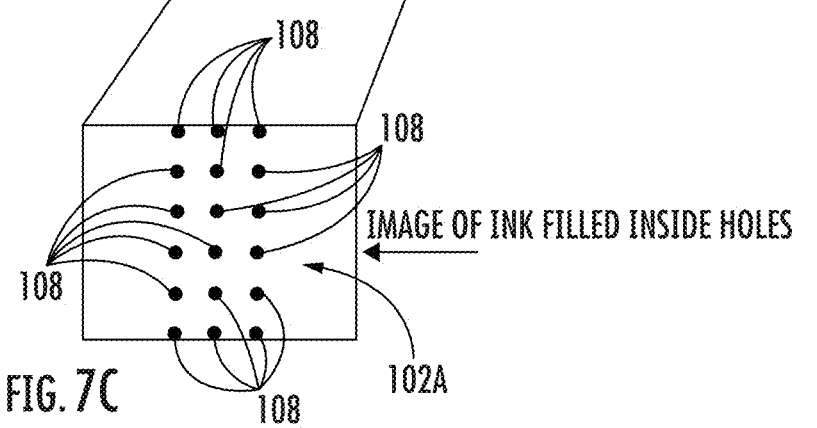
FIG. 7C

METHOD OF MAKING A LENSED CONNECTOR WITH PHOTOSENSITIVE GLASS

PRIORITY APPLICATION

This application claims the benefit of priority of U.S. Provisional Application No. 63/061,543, filed on Aug. 5, 2020, the content of which is relied upon and incorporated herein by reference in its entirety.

FIELD OF THE DISCLOSURE

The present disclosure relates to methods of making a lensed connector from photosensitive glass and more particularly, to methods of making a lensed connector from photosensitive glass that is aligned with an optical fiber ferrule.

BACKGROUND OF THE DISCLOSURE

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables.

Over the past few years, parallel fiber-optic connectivity solutions became the mainstream technology for enterprise networks and data centers, but with the quickly growing demand for connectivity density, the number of optical fibers to be connected at once (i.e. within a single connector) continues to increase. Today, the industry standard is ferrule-based, physical contact (PC), mechanical transferrable (MT) or multi-fiber push-on (MPO) connector, also referred to as MTP® connector, designating an improved design over the generic MPO connector. The number of optical fibers (both single mode (SM) and multimode (MM)) per ferrule can vary from 4 fibers to 72 fibers. However, the increased optical fiber count imposes strict requirements on the quality of ferrule end-face polishing to maintain the protrusion height among each fiber. Variation in the fiber protrusion height results in a significant increase in the mating force needed to achieve full physical contact for all optical fiber pairs in a connection between two mated ferrules. Moreover, insertion loss also tends to deteriorate with the increased number of optical fibers per connector.

Lensed or expanded beam (EB) connectors are viable alternatives to PC-based high optical fiber count connectivity solutions. Lensed connectors have a number of advantages, such as resistance to contamination, high tolerance to lateral and longitudinal misalignments, and no need for polishing the end face of the ferrule.

However, despite the aforementioned advantages of lensed connectors, continued improvement in the foregoing is desired.

SUMMARY OF THE DISCLOSURE

The present disclosure relates to a method of making a lensed connector in which a glass ferrule has holes within the body of the glass ferrule, and the glass ferrule is subsequently processed to form lens structures along the ferrule.

In one embodiment, a method of making a lensed connector comprising: inserting a light occluding agent into at least one hole of a ferrule made of glass, wherein the at least one hole extends partially through the ferrule from a first surface; applying UV light onto the first surface of the ferrule such that the light occluding agent prevents a portion of the ferrule from being treated by the UV light, thereby forming an untreated portion of the ferrule; removing the light occluding agent from the ferrule; and thermally developing the ferrule such that the untreated portion of the ferrule forms a dome shaped lens structure protruding from a second surface of the ferrule, wherein the second surface is opposite the first surface.

In another embodiment, the method further includes: inserting an optical fiber into the at least one hole; and bonding the optical fiber to the lens structure within the at least one hole with an adhesive. In another embodiment, the hole extends into between 25% and 80% of a thickness of the ferrule. In another embodiment, the hole has a length between 550 µm and 1100 µm. In another embodiment, the dome shaped lens structure has a sag height ranging between 4.5 µm and 13 µm. In another embodiment, the UV light has a wavelength ranging between 300 nm and 340 nm. In another embodiment, the glass ferrule comprises a photosensitive glass. In another embodiment, during the thermally developing, the untreated portion of the ferrule softens and the photosensitive glass of the ferrule surrounding the untreated portion shrinks in volume to squeeze the untreated portion and form the dome shaped lens structure. In another embodiment, the hole is substantially circular in shape having a center and an outer surface with at least one protuberance, wherein the at least one protuberance extends radially inward towards the center by a distance between 1 µm and 100 µm. In another embodiment, the at least one protuberance is configured to engage with an outer surface of the optical fiber inserted into the at least one hole. In another embodiment, the distance defines a gap through which the adhesive can flow and exit the at least one hole. In another embodiment, the at least one hole comprises a plurality of holes arranged in an array. In another embodiment, the array of the plurality of holes is two-dimensional and rectangular with between 2 and 8 rows and between 6 and 24 columns. In another embodiment, the array of the plurality of holes is two-dimensional and rectangular with at least 96 holes. In another embodiment, thermally developing the ferrule comprises subjecting the ferrule to a temperature ranging between 500° C. and 600° C. and for a time period between 0.5 hours and 2 hours.

In one embodiment, a lensed connector assembly is provided. The lensed connector assembly comprising: a ferrule made of photosensitive glass and having a first surface, a second surface opposite the first surface, and a ferrule body between the first surface and the second surface; the ferrule having at least one hole extending into the ferrule body from the first surface to define an internal surface; wherein the at least one hole is substantially circular in shape having a center and an outer surface with at least one protuberance, wherein the at least one protuberance extends radially inward towards the center by a distance between 1 µm and 100 µm; the ferrule further including: a dome shaped lens structure integrally formed with the ferrule, the dome shaped lens structure extending from the internal surface into the at least one hole and extending beyond the second surface of the ferrule, the dome shaped lens structure has a sag height between 4.5 µm and 13 µm; and an optical fiber in the at least one hole and bonded to the dome shaped lens structure.

In another embodiment, the hole has a length between 550 µm and 1100 µm. In another embodiment, the hole extends into between 25% and 80% of a thickness of the ferrule. In another embodiment, the at least one protuberance engages an outer surface of the optical fiber in the at least one hole. In another embodiment, the at least one hole comprises a plurality of holes arranged in an array. In another embodiment, the array of the plurality of holes is two-dimensional and rectangular with between 2 and 8 rows and between 6 and 24 columns. In another embodiment, the array of the plurality of holes is two-dimensional and rectangular with at least 96 holes. In another embodiment, thermally developing the ferrule comprises subjecting the ferrule to a temperature ranging between 500° C. and 600° C. for a time period between 0.5 hours and 2 hours. In another embodiment, during the thermally developing, the untreated portion of the ferrule softens and the photosensitive glass of the ferrule surrounding the untreated portion shrinks in volume to squeeze the untreated portion and form the dome shaped lens structure.

In one embodiment, a lensed connector formed by a method is provided. The method comprising: inserting a light occluding agent into at least one hole of a ferrule made of glass, wherein the at least one hole extends partially through the ferrule from a first surface; wherein the glass ferrule is made of photosensitive glass; wherein the hole is substantially circular in shape having a center and an outer surface with at least one protuberance, wherein the at least one protuberance extends radially inward towards the center by a distance between 1 μm and 100 μm; applying UV light onto the first surface of the ferrule such that the light occluding agent prevents a portion of the ferrule from being treated by the UV light, thereby forming an untreated portion of the ferrule; removing the light occluding agent from the ferrule; and thermally developing the ferrule such that the untreated portion of the ferrule forms a dome shaped lens structure protruding from a second surface of the ferrule, wherein the second surface is opposite the first surface.

In another embodiment, the method further includes: inserting an optical fiber into the at least one hole; and bonding the optical fiber to the lens within the at least one hole with an adhesive. In another embodiment, wherein the hole extends into between 25% and 80% of a thickness of the ferrule. In another embodiment, the dome shaped lens structure has a sag height ranging between 4.5 μm and 13 μm. In another embodiment, the UV light has a wavelength ranging between 300 nm and 340 nm. In another embodiment, the at least one protuberance engages with an outer surface of the optical fiber inserted into the at least one hole. In another embodiment, the distance defines a gap through which the adhesive can flow and exit the at least one hole. In another embodiment, the at least one hole comprises a plurality of holes arranged in an array. In another embodiment, the array of the plurality of holes is two-dimensional and rectangular with between 2 and 8 rows and between 6 and 24 columns. In another embodiment, the array of the plurality of holes is two-dimensional and rectangular with at least 96 microbores. In another embodiment, thermally developing the ferrule comprises subjecting the ferrule to a temperature ranging between 500° C. and 600° C. for a time period between 0.5 hours and 2 hours. In another embodiment, during the thermally developing, the untreated portion of the ferrule softens and the photosensitive glass of the ferrule surrounding the untreated portion shrinks in volume to squeeze the untreated portion and form the dome shaped lens structure.

Additional features and advantages will be set out in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

FIGS. 7A-13 relate to Example 1 and illustrate various characteristics of a lensed connector in accordance with the present disclosure.

DETAILED DESCRIPTION

Various embodiments will be clarified by examples in the description below. In general, the present disclosure relates to a method of making a lensed connector in which a glass ferrule has holes within the body of the glass ferrule, and the glass ferrule is subsequently processed to form lens structures along the ferrule.

Figure 1:
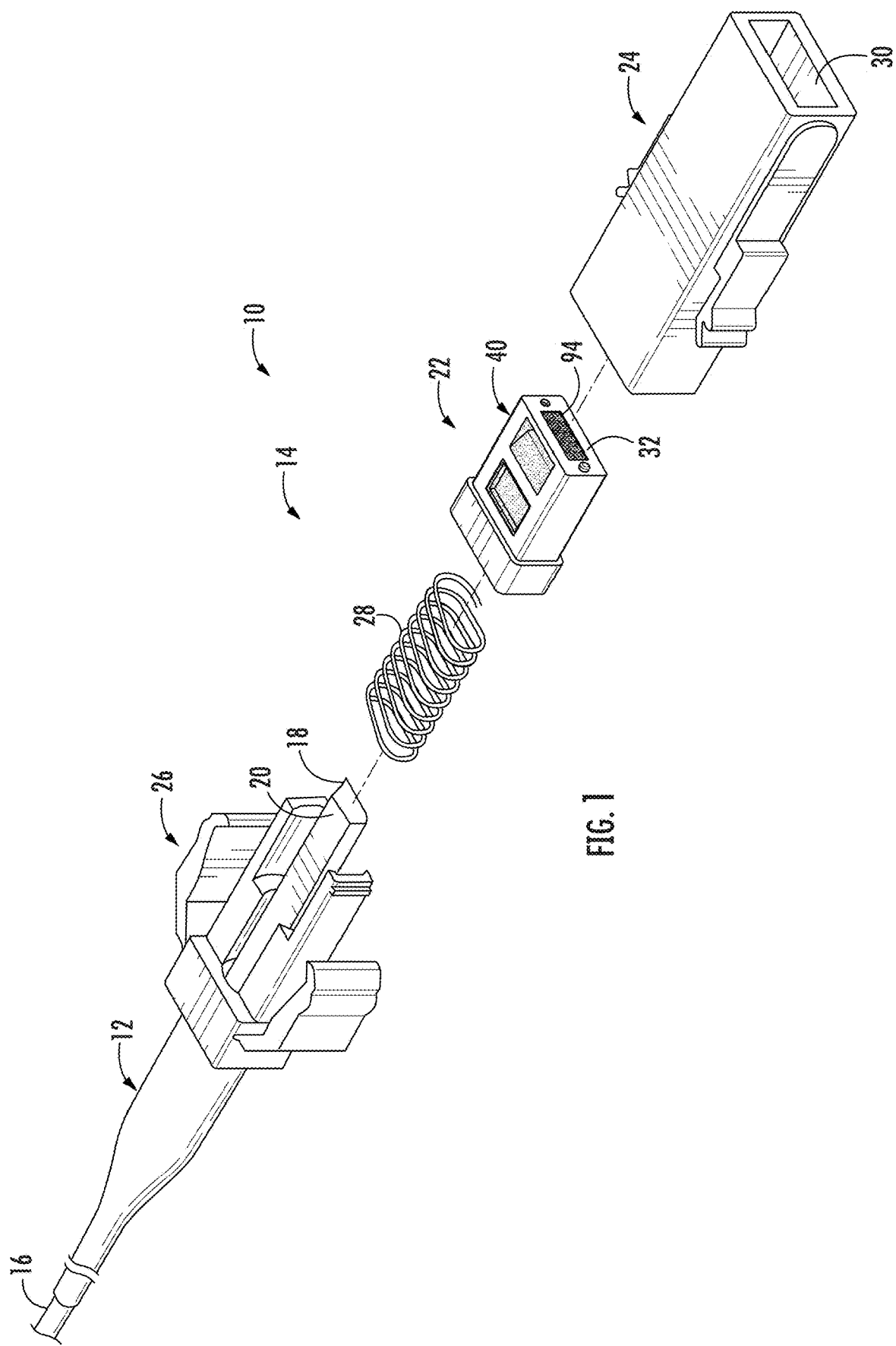
FIG. 1 is a disassembled view of a fiber optic cable assembly.

Referring first to FIG. 1, an exemplary fiber optic cable assembly 10 includes a fiber optic cable 12 and a fiber optic connector 14 (also referred to as "optical connector", or simply "connector"). Although the connector 14 is shown as having the form factor of a MXC® connector (available from US Conec, Ltd., of Hickory, N.C., USA), the features described below may be applicable to different connector designs. This includes single-fiber or multi-fiber connector designs. Similarly, the illustrated cable 12 is merely an example to facilitate discussion, and persons skilled in optical connectivity will appreciate how different cable designs may be terminated with the connector 14 to provide different fiber optic cable assemblies. While the fiber optic cable assembly 10 is illustrated as including one connector 14, it should be realized that the fiber optic cable 12 may include a large number of optical fibers and be terminated by multiple connectors 14. Thus, aspects of the present disclosure are not limited to the particular cable 12 and connector 14 shown and described herein.

As will be described in more detail below, the fiber optic connector 14 is configured as a "lensed" connector having an optical element configured to expand and collimate the light beam from the optical fibers of the cable 12 for transmission across an optical joint, such as between two mated connectors or between a connector and other optic component.

The illustrated fiber optic cable 12 of FIG. 1 includes an outer jacket 16 that surrounds and protects a plurality of optical fibers 18. In one embodiment of the disclosure, the optical fibers 18 may be configured as a plurality of ribbons 20 each carrying a plurality of optical fibers 18 (e.g., 12, 16 or 24 optical fibers) arranged in a side-by-side manner. Such ribbons 20 are generally well known in the art and thus will not be described further herein. It should be appreciated that the plurality of optical fibers 18 are not limited to an arrangement of ribbons but may be presented in alternative forms and remain within the scope of the disclosure.

In an exemplary embodiment, the connector 14 includes a ferrule 22 configured to support the plurality of optical fibers 18, a housing 24 having a cavity in which ferrule 22 is received, and a connector retention body 26 configured to support the fiber optic cable 12 and retain the ferrule 22 within the housing 24. The ferrule 22 may be biased to a forward position within the housing 24 by a spring 28. The housing 24 and the connector retention body 26 may be coupled together, such as through a snap fit or the like, to capture the ferrule 22 within the housing 24. When the connector 14 is assembled, a front end 30 of the housing 24 may project beyond a front end 32 of the ferrule 22 to define a cavity. Connector 14 is configured as an expanded beam or lensed connector providing expanded light beams from the optical fibers 18 that travel across a void space or region when two connectors are mated together. The construction and interoperability between the various parts of connector 14 are generally known to persons of ordinary skill in optical connectivity and thus will not described further herein. It should be understood that aspects of the disclosure are not limited to the particular shape, size, and configuration of the ferrule or housing shown and described herein but are applicable to a wide range of ferrule and housing configurations.

Figure 2:
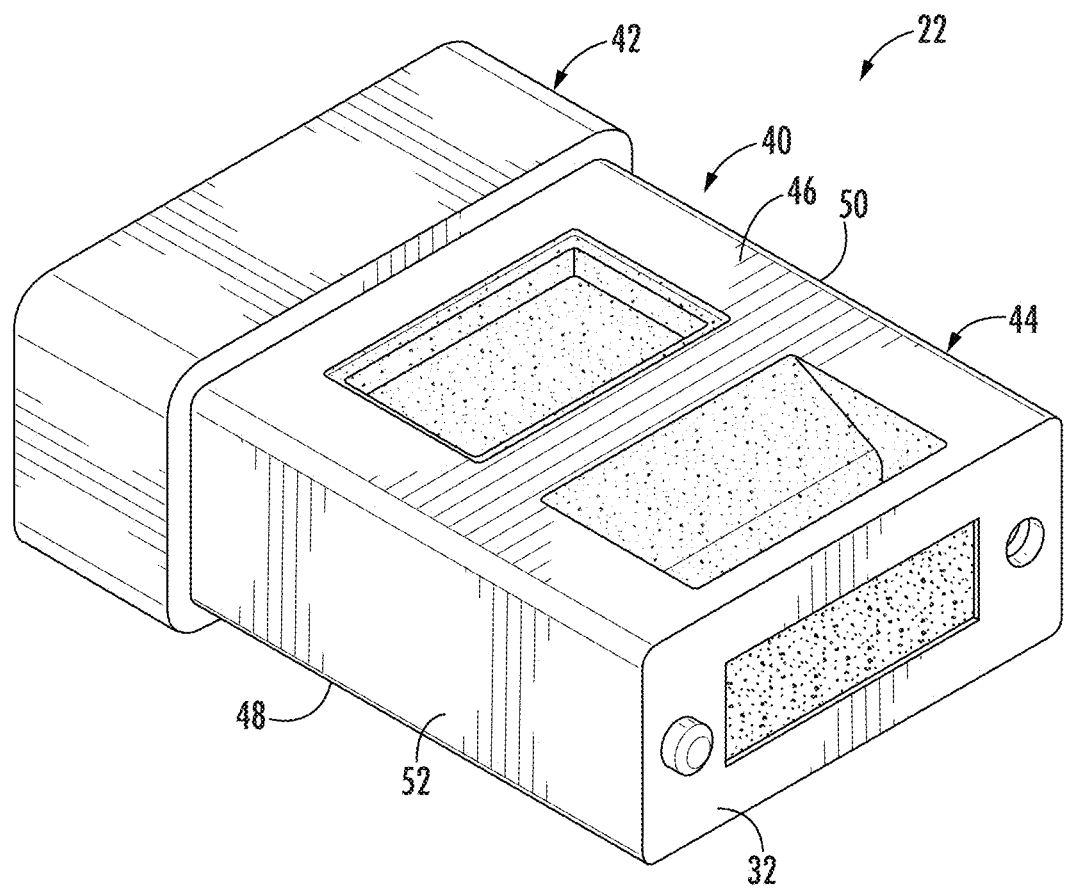
FIG. 2 is a perspective view of a ferrule of the fiber optic connector assembly shown in FIG. 1.
Figure 3:
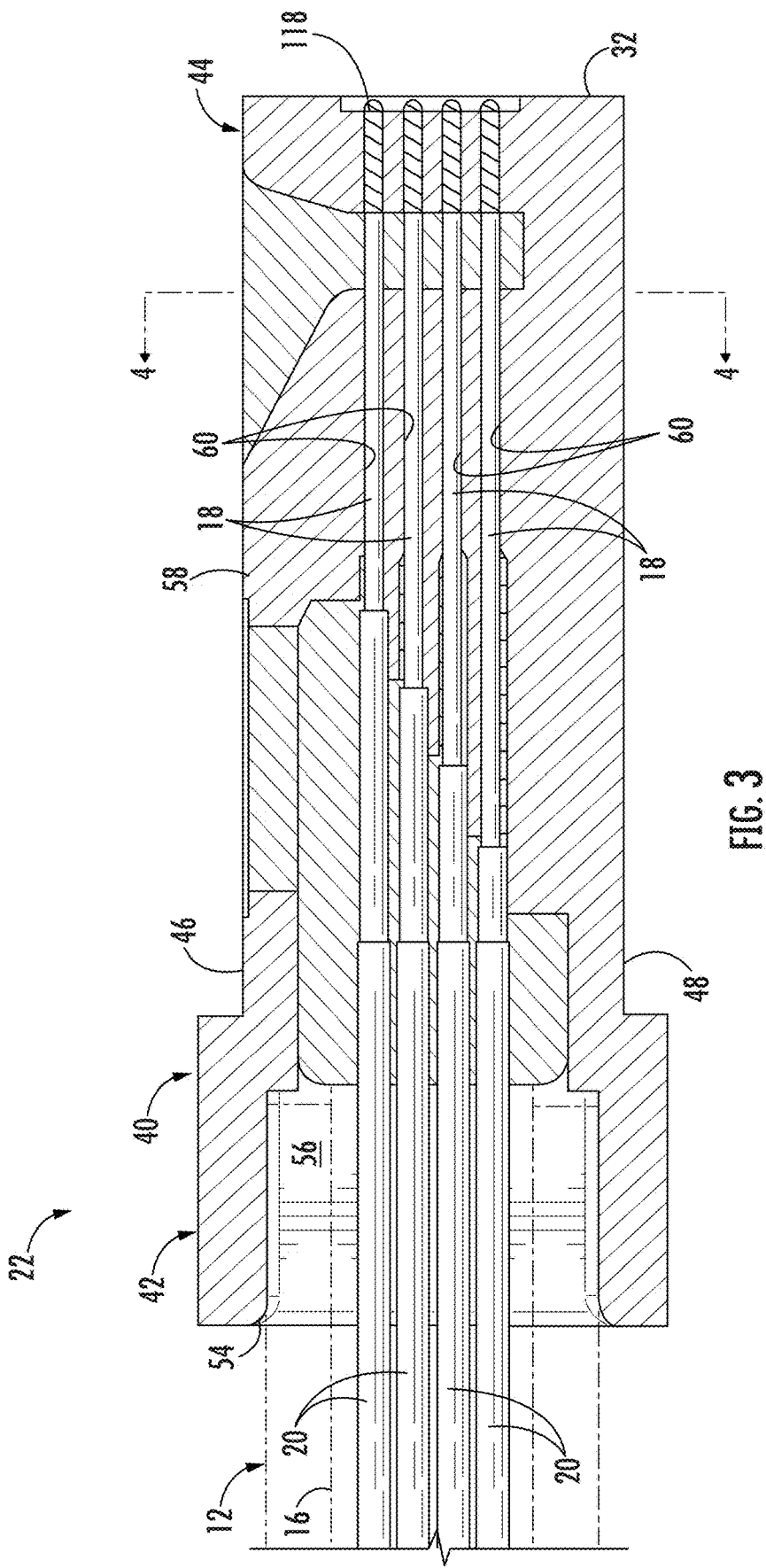
FIG. 3 is a cross-sectional view of the ferrule illustrated in FIG. 2.

FIGS. 2 and 3 illustrate a ferrule 22 in accordance with an exemplary embodiment of the disclosure. The ferrule 22 includes a generally rectangular body 40 having a rear portion 42, a front portion 44, a top wall 46, bottom wall 48, and generally parallel side walls 50, 52. It should be recognized that while the ferrule 22 is described as having a generally rectangular configuration, aspects of the invention are not limited to such an arrangement. More particularly, ferrule 22 may have a wide range of shapes and sizes and remain within the scope of the present disclosure. The terms "rear" and "forward" refer to positions relative to the main fiber optic cable 12, with "rear" being located closer to the main fiber optic cable 12 than "forward". The rear portion 42 of the ferrule 22 includes an opening 54 for accessing a first internal cavity 56 of the ferrule 22. The first internal cavity 56 is configured to receive the optical fibers 18 from the ribbons 20 carried by the fiber optic cable 12. The forward end of the cavity 56 is closed off by an intermediate wall 58 that defines a plurality of micro-bores 60 each configured to receive a respective optical fiber 18 from the ribbons 20 of the fiber optic cable 12.

Figure 4:
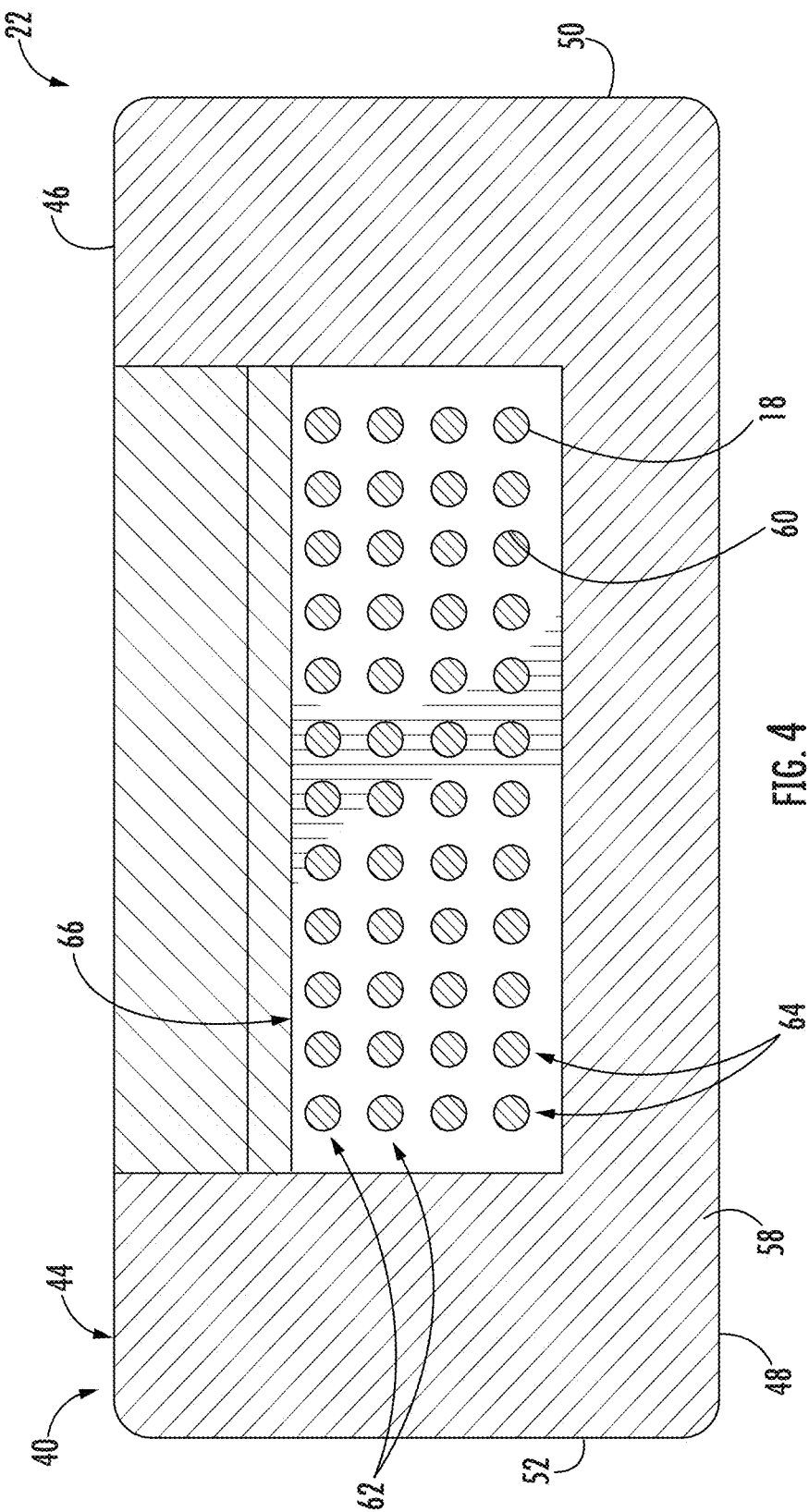
FIG. 4 is a cross-sectional view of the ferrule taken along line 4-4 illustrated in FIG. 3.

In an exemplary embodiment, and as illustrated in FIG. 4, the plurality of micro-bores 60 are arranged in a two-dimensional pattern of rows 62 and columns 64 to define a two-dimensional array 66 of micro-bores 60. The number of micro-bores 60 in each row 62 may depend on, for example, how many optical fibers 18 are carried by each ribbon 20. By way of example and without limitation, the number of micro-bores 60 in each row 62 may be between 6 and 36 micro-bores. In an exemplary embodiment, there may be 12 or 16 micro-bores 60 in each row 62—at least 96 micro-bores—8 rows and 12 columns of microbores. In one embodiment, the number of micro-bores 60 in each row 62 of the array 66 may be the same. In an alternative embodiment, however, the number of micro-bores 60 in each row 62 of the array 66 may differ. By way of further example, the number of rows 62 in the array 66 may be between 2 and 8. In an exemplary embodiment, there may be 4 rows 62 of micro-bores 60 in the array 66. It should be understood, however, that the micro-bores 60 may be formed in the intermediate wall 58 in other numbers and configurations and should not be limited to the particular arrangement described above. For example, aspects of the disclosure may be beneficial for one-dimensional arrays as well.

Figure 5:
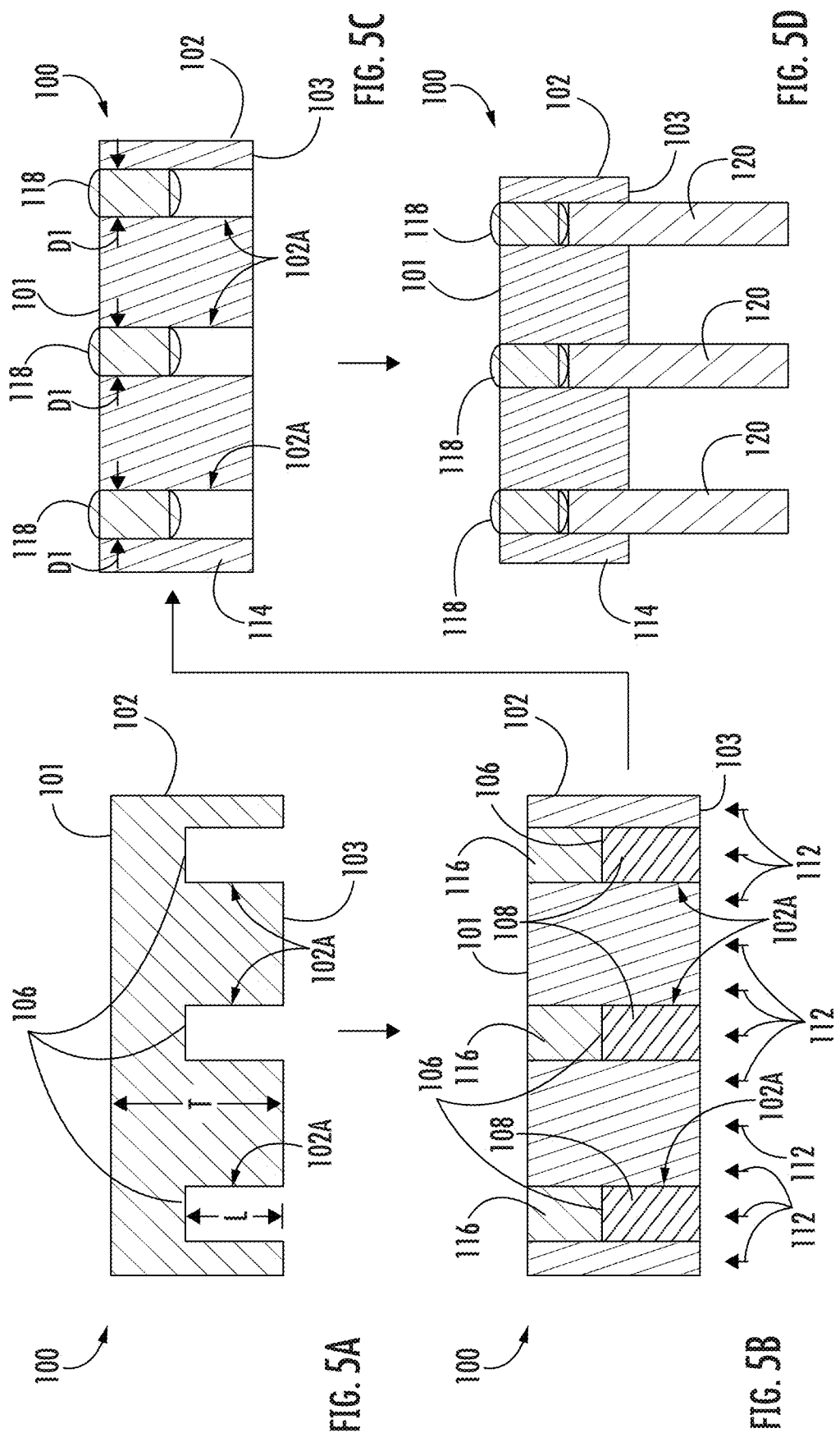
FIGS. 5A-5D are cross sectional views of a ferrule illustrating a method of making a lensed connector.

Referring now to FIGS. 5A-5D, a method 100 of making a lensed ferrule is shown. Referring first to FIG. 5A, a ferrule 102 is shown. In some embodiments, ferrule 102 is made of a photosensitive glass. Photosensitive glass is used to produce microlens arrays in which lithium meta-silicate or a like compound within the glass produces a physical change in density generated by photonucleation of a phase crystallization. Under the appropriate exposure pattern, the change in density of the glass can be used to produce surface features that act as lenses as discussed below. It is within the scope of the present disclosure that in alternate embodiments, ferrule 102 is made of alternate suitable glass materials.

Ferrule 102 includes a front surface 101, a back surface 103 opposite front surface 101, and holes 102A extending from back surface 103 to within ferrule 102. For convenience, back surface 103 will be referred to as "first surface 103", as in alternative embodiments back surface 103 may not necessarily define a back end of ferrule 102. Likewise, front surface 101 will be referred to as "second surface 101". Holes 102A extend partially through ferrule 102 from first surface 103. In some embodiments, holes 102A occupy a portion of a thickness T of ferrule 102. In some embodiments, holes 102A span a portion of thickness T of ferrule 102 ranging between 25% and 80% or between 25% and 75%. In some embodiments, holes 102A have a length L ranging between 0.2 mm and 1.0 mm, between 0.3 mm and 1.0 mm, or between 0.4 mm and 1.0 mm. In some embodiments, holes 102A have a length L that is not longer than 2 mm. In some embodiments, thickness of glass in line with holes 102A (i.e., thickness defined by T-L) ranges between 0.4 mm and 1.2 mm, between 0.5 mm and 1.1 mm, or between 0.5 mm and 1.0 mm. Holes 102A define an internal surface 106 within ferrule 102. Holes 102A are configured to receive a light occluding agent 108 discussed below. Holes 102A are also configured to receive optical fibers 120 (in accordance with the specification of the fiber array) as discussed in greater detail below.

In some embodiments, holes 102A have a substantially circular cross section or cylindrical shape. That is, holes 102A have a substantially circular cross section with substantially vertical edges (i.e., edges are substantially perpendicular to first surface 103). In some embodiments, holes 102A have different cross section shapes such as triangular, square, or other polygonal shape. To receive optical fibers 120, holes 102A are dimensioned such that the diameters of holes 102A are larger than the outer diameter of the cladding of optical fibers 120. In some embodiments, the diameters of holes 102A are greater than the outer diameters of optical fibers 120 by at most 1 μm. The difference in diameters provides an escape path for excess adhesive that is added to hole 102A prior to inserting optical fiber 120 as discussed in greater detail below. Holes 102A can be drilled into ferrule 102 via different methods, such as using mechanical drilling, using pulsed laser drilling, etc. each of which are contemplated by and are within the scope of the present disclosure.

Figure 6:
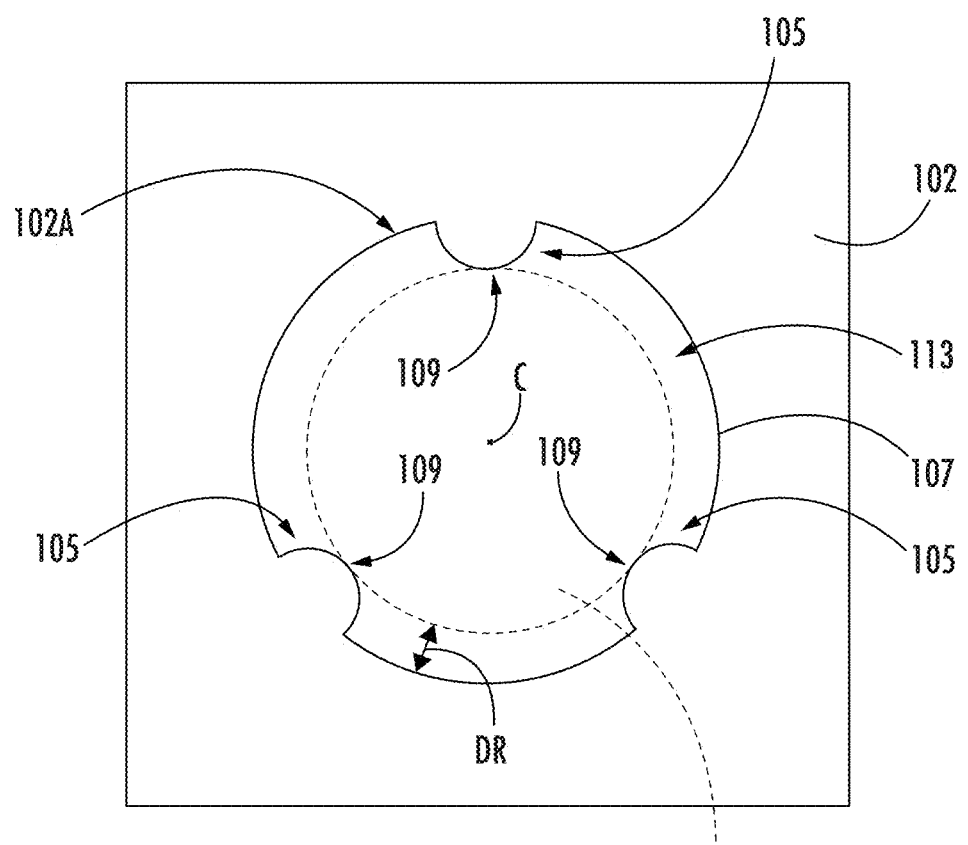
FIG. 6 is a cross sectional view of a ferrule having a hole shaped in accordance with an embodiment of the present disclosure.

Referring briefly to FIG. 6, an alternate cross sectional shape of hole 102A is shown. As shown, hole 102A has a non-circular cross sectional shape. In particular, hole 102A includes protuberances 105 that are inwardly extending towards a center C of hole 102A. As shown, protuberances 105 have a depth or extend radially inward a distance DR from outer surface 107 of hole 102A (or, more specifically, from a circular profile based on outer surface 107). In some embodiments, distance DR ranges between 1 μm and 100 μm, between 1 μm and 25 μm, or between 1 μm and 10 μm. When optical fiber 120 is inserted into hole 102A, optical fiber 120 engages with protuberances 105 at interfaces 109 such that outer surface of optical fiber 120 is spaced from outer surface 107 of hole 102A at a distance DR. Stated another way, when optical fiber 120 is inserted into hole 102A optical fiber 120 engages with protuberances 105 to define a gap 113 between outer surface of optical fiber 120 and outer surface 107 of hole 102A. In this way, protuberances 105 provide an escape path for excess adhesive inserted into hole 102A via gap 113. Additionally, protuberances 105 enable lens 118 (FIGS. 5C and 5D) created by the methods disclosed herein to have a larger diameter than optical fiber 120. Also, advantageously, protuberances 105 enable improved positioning of optical fiber 120 within hole 102A such that improved alignment between the core (not shown) of optical fiber 120 and lens 118 is achieved while also providing an escape path for an adhesive inserted into holes 102A.

Referring now to FIG. 5B, a light occluding agent 108 is inserted into holes 102A to contact internal surface 106 and substantially fill hole 102A. In some embodiments, light occluding agent is a liquid suspension, such as oil suspended in acetone (e.g., Black oil 860 as manufactured by Orient Chemical Industries Co., Ltd. suspended in acetone). However, it is contemplated that in alternate embodiments, other suitable liquid suspensions may be used, such as Oil Black HBB, Oil Black 803, Oil Black 5970, Oil Black 5906, or Oil Black 5905 as manufactured by Orient Chemical Industries Co., Ltd. In the context of the present disclosure, light occluding agent 108 is dissolved in acetone prior to injection into holes 102A. Then, light occluding agent 108 in acetone is injected into holes 102A and upon injection, acetone is evaporated leaving light occluding agent 108 in holes 102A.

Then, light 112 is applied onto first surface 103 of ferrule 102 and onto light occluding agent 108. Applied UV light 112 is configured to treat ferrule 102 such that ferrule 102 comprises treated glass 114 (FIG. 5C) and untreated glass 116 (FIG. 5C). In particular, when light 112 is applied onto first surface 103, ferrule 102 undergoes photonucleation of a phase crystallization. That is, exposure of light 112 onto ferrule 102 induces nucleation of ferrule 102 (e.g., ferrule 102 made of photosensitive glass) where ferrule 102 changes in density. In some embodiments, upon photonucleation, the total crystal content of ferrule 102 is between 10 wt. % by volume and 20 wt. % by volume. By contrast, light occluding agent 108 prevents the application of light 112 onto internal surface 106 thereby preventing photonucleation of a portion of ferrule 102 in line with light occluding agent 108 (i.e., untreated glass 116). In some embodiments, light 112 is UV light. In some embodiments, light 112 has a wavelength ranging between 300 nm and 340 nm, between 305 nm and 330 nm, or between 315 nm and 320 nm. In some embodiments, light 112 is applied onto first surface 103 and onto light occluding agent 108 having an energy ranging between 5 J per square centimeters and 25 J per square centimeters, between 5 J per square centimeters and 20 J per square centimeters, or between 5 J per square centimeters and 10 J per square centimeters. In some embodiments, light 112 is UV light having a wavelength of about 315 nm.

After treatment with light 112, light occluding agent 108 is removed by adding acetone to re-dissolve light occluding agent 108 to flow out of holes 102A, and ferrule 102 is subsequently thermally developed. In some embodiments, thermal development of ferrule 102 is performed at a temperature ranging between, between 505° C. and 595° C., or between 510° C. and 590° C. for a time period ranging between 0.5 hours and 2 hours, between 1 hour and 2 hours, or between 1.5 hours and 2 hours. In some embodiments, thermal development is performed at a temperature of about 575° C. for a duration of about 2 hours. As shown in FIG. 5C, upon thermal development, treated glass 114 crystallizes and shrinks in volume while untreated glass 116 softens. The shrinking of treated glass 114 results in treated glass 114 moving in directions D1, which functions to squeeze untreated glass 116 outwardly, and the surface tension of untreated glass 116 creates a dome shaped lens 118 protruding beyond a second surface 101 of ferrule 102 and a similar dome shaped structure below.

In some embodiments, lens 118 has a sag height ranging between 1 μm and 25 μm, between 2 μm and 20 μm, or between 4 μm and 15 μm. In some embodiments, lens 118 has a numerical aperture (NA) between 0.09 and 0.13. As used herein, "sag height" refers to the distance from the apex of lens 118 to the surface onto which lens 118 is applied.

Next, as shown in FIG. 5D, optical fibers 120 are inserted into holes 102A of ferrule 102. Prior to insertion of optical fibers 120 into holes 102A, a small amount of adhesive is inserted into hole 102A. In some embodiments, the adhesive used has a refractive index that is matched to lens 118 to minimize any surface scattering or reflection. In some embodiments, the adhesive is an epoxy compound. However, it is contemplated that in alternate embodiments, other suitable adhesives may be used. After the adhesive is inserted into hole 102A, optical fibers 120 are inserted into holes 102A and are bonded to lens 118 via the adhesive under conditions generally known in the art.

Example 1

Referring now to FIGS. 7A-13, various steps and corresponding data of method 100 are shown. Referring first to FIGS. 7A-7C, images of lens array laser drill holes 102A in ferrule 102 (made from photosensitive glass) before and after filling with the light occluding agent 108 (e.g., Oil Black 860 as manufactured by Orient Chemical Industries Co., Ltd) are shown. In particular, FIG. 7A shows ferrule 102 prior to insertion of light occluding agent 108 into holes 102A where each hole has a different size/length within ferrule 102 and thereby having varying amounts of light occluding agent 108, and FIGS. 7B and 7C show ferrule 102 after insertion of light occluding agent 108 into holes 102A. As shown, holes 102A with light occluding agent 118 appear to be substantially uniform in shape and appearance.

Figure 8A:
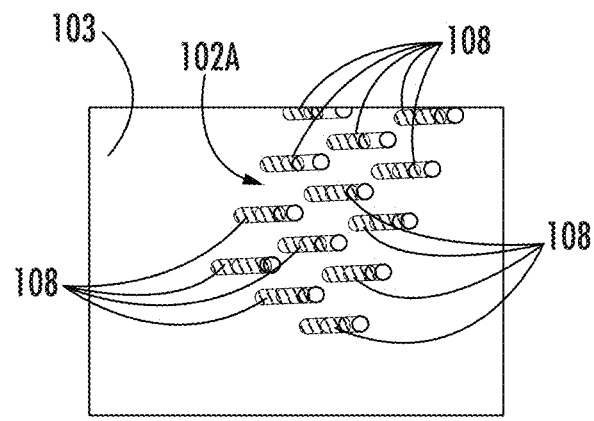
Figure 8B:
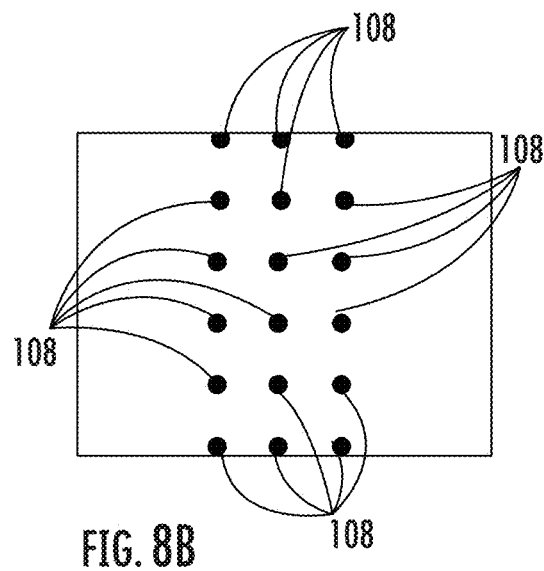
Figure 8C:
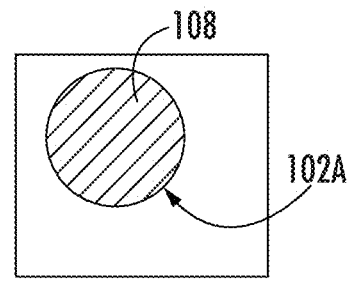
Figure 8D:
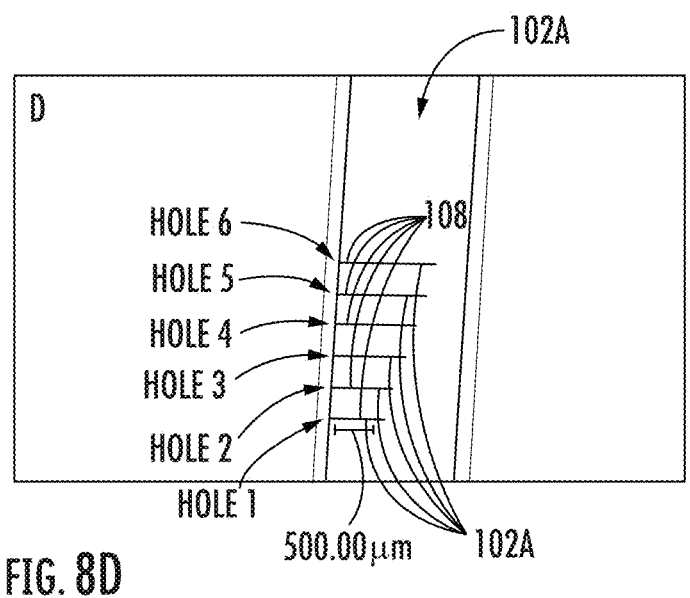

Referring now to FIGS. 8A-8D, additional side and back images of holes 102A filled with light occluding agent 118 are shown. FIG. 8A shows the appearance of holes 102A from underneath the laser hole drill side (i.e., first surface 103). FIG. 8B shows a detailed view of holes 102A filled with light occluding agent 108. FIG. 8C shows a detailed view of a hole 102A filled with light occluding agent 108. FIG. 8D shows different lengths of holes 102A with each hole 102A filled with light occluding agent 108. Variations of the lengths of holes 102A affect the height of resulting lens 118—shallower drill holes produce lens with a higher lens height. Without wishing to be held to any particular theory, it is believed that shallower drill holes produce lens with a higher lens height because when ferrule 102 is thermally processed, there is a greater amount of untreated glass 116 to squeeze and bulge out of ferrule 102.

Figure 9:
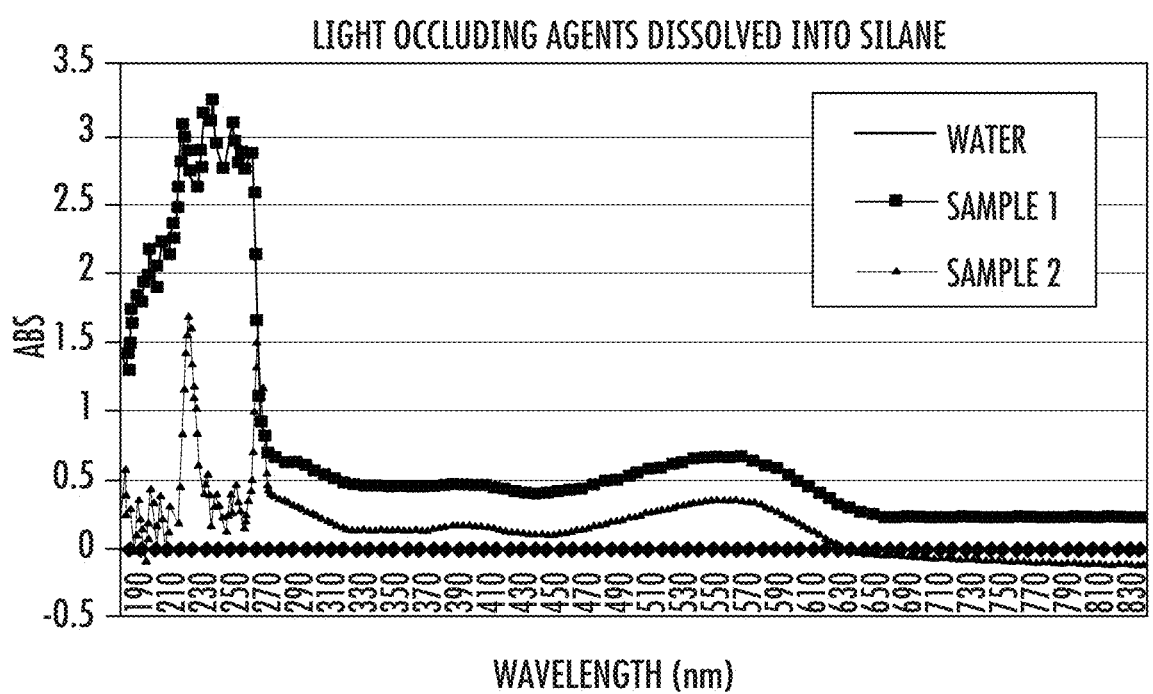

Referring now to FIG. 9, a UV Vis spectral absorbance profile of light occluding agent 108 (about 1 mg/ml of light occluding agent 108) dissolved/suspended into a silane is shown. The silane was one prospective solvent, but pure acetone was another for its volatility and thereby, rapid leaving ability when filling holes 102A with light occluding agent 108. As shown, Sample 1 (Oil black 860) had a higher absorbance at 315 nm than Sample 2 (Oil Black BS), which is a wavelength at which light 112 is used to seed ferrule 102.

Figure 10:
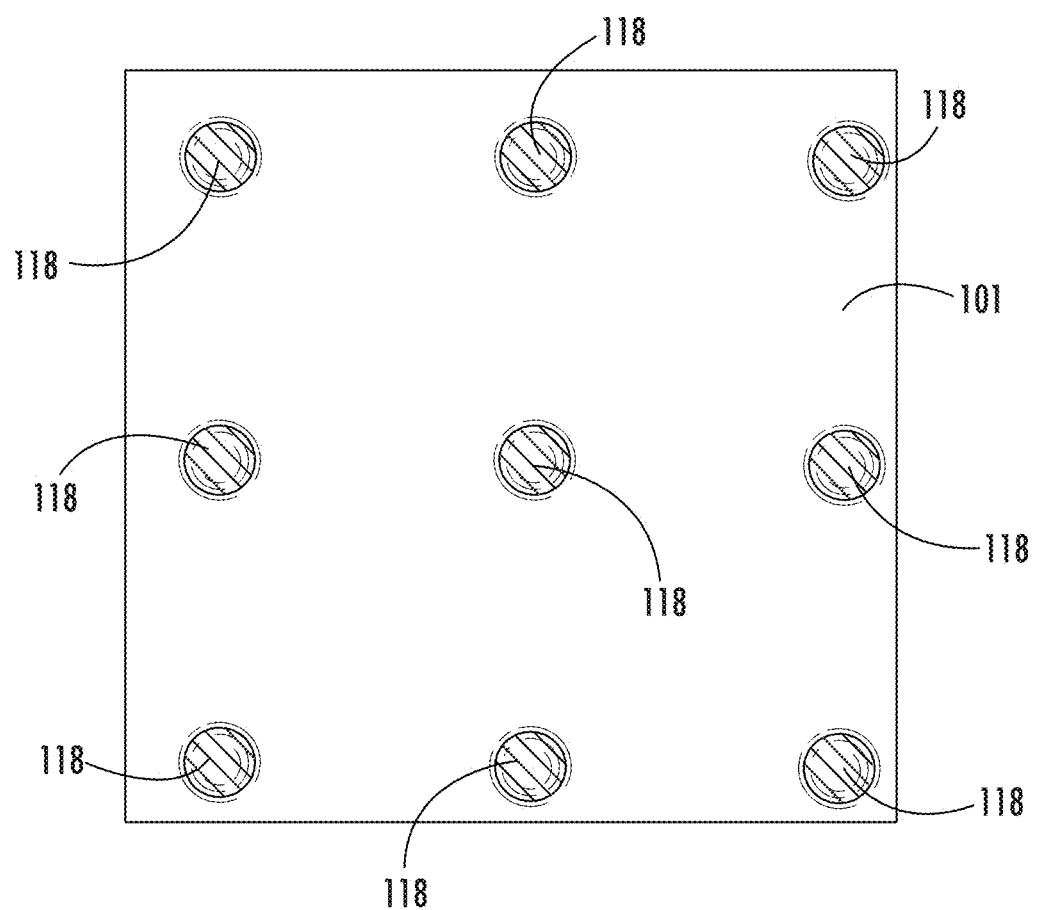
Figure 11:
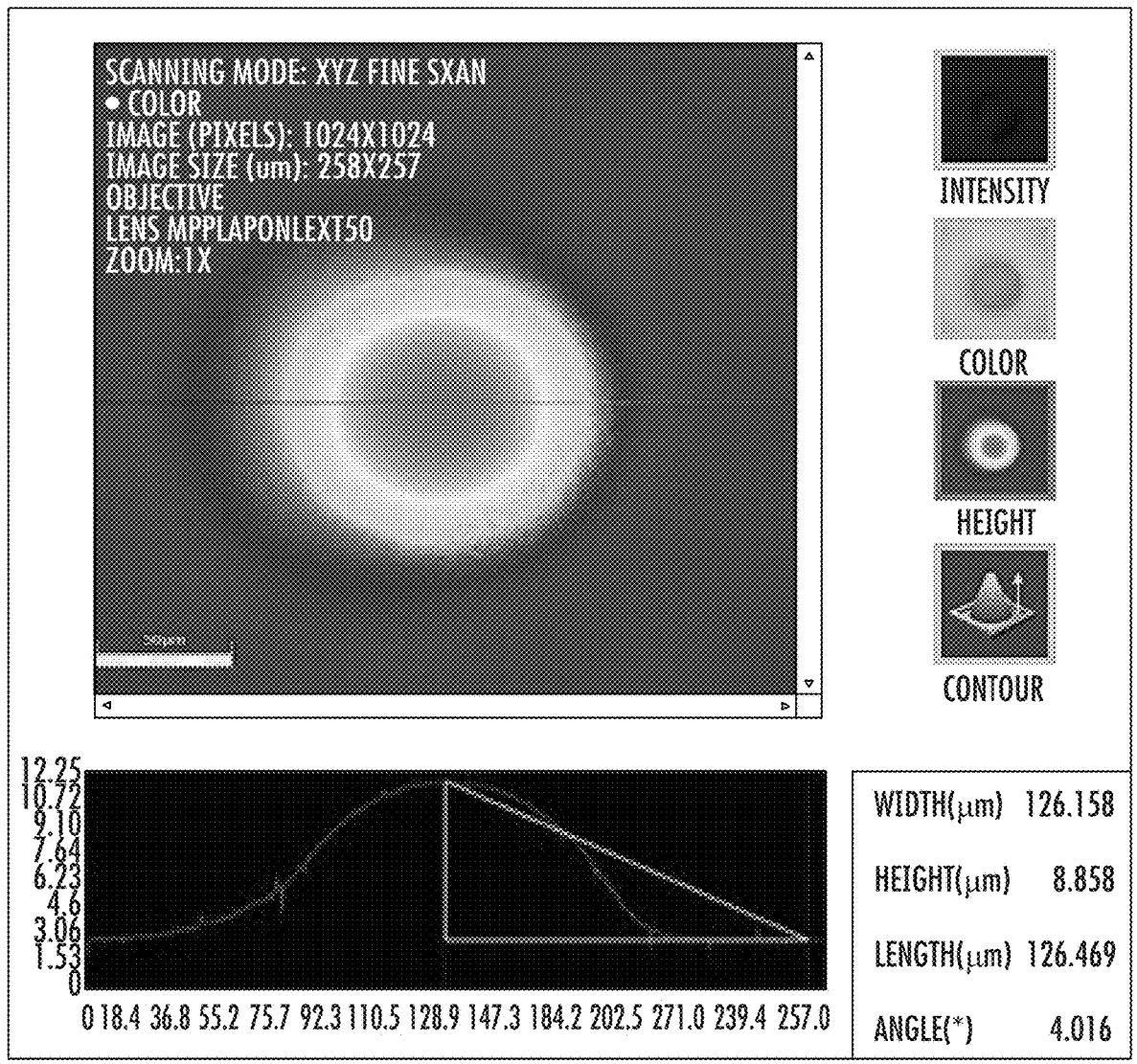

Referring now to FIGS. 10-13, physical characterization data of lenses 118 formed from Sample 1 experiments of FIG. 10 are shown. FIG. 10 shows a top down image over three rows/columns of raised lenses 118 made in ferrule 102 using Sample 1 as light occluding agent 108. FIG. 11 shows a corresponding Zygo profilometery of a single lens formed using method 100 with Sample 1 as the light occluding agent 108. As shown in the lower panel of FIG. 11, lens 118 has a height of about 8.9 microns.

Table 1 shows the correlation between the height of lens 118 and depth of drill holes 102A shown in FIG. 8D. As mentioned previously, variations of the lengths of holes 102A affect the height of resulting lens 118—shallower drill holes produce lens with a higher lens height. Without wishing to be held to any particular theory, it is believed that shallower drill holes produce lens with a higher lens height because when ferrule 102 is thermally processed, there is a greater amount of untreated glass 116 to squeeze and bulge out of ferrule 102.

TABLE 1

| | Hole # | | | | | |
|---|---|---|---|---|---|---|
| | 1 | 2 | 3 | 4 | 5 | 6 |
| Hole depth (μm) | 570 | 670 | 770 | 870 | 970 | 1070 |
| Residual Glass thickness (μm) | 1430 | 1330 | 1230 | 1130 | 1030 | 930 |
| Sag height (μm) | 12.3 | 12.6 | 9.6 | 8.7 | 6.8 | 4.5 |
| Focal length in glass (μm) | 504 | 493 | 637 | 700 | 889 | 1335 |

Figure 12:
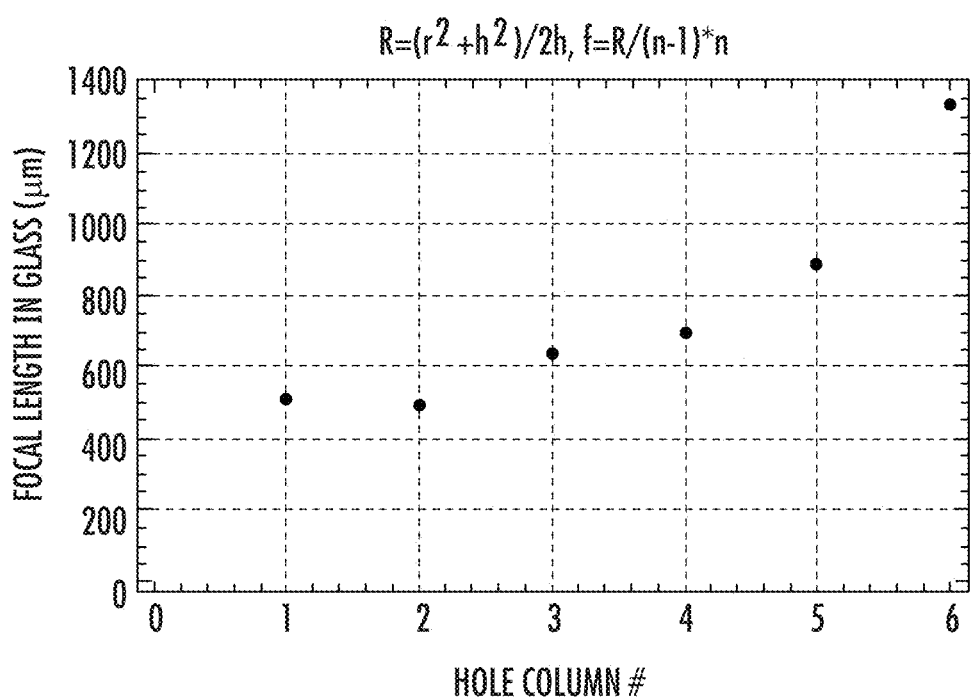
Figure 13:
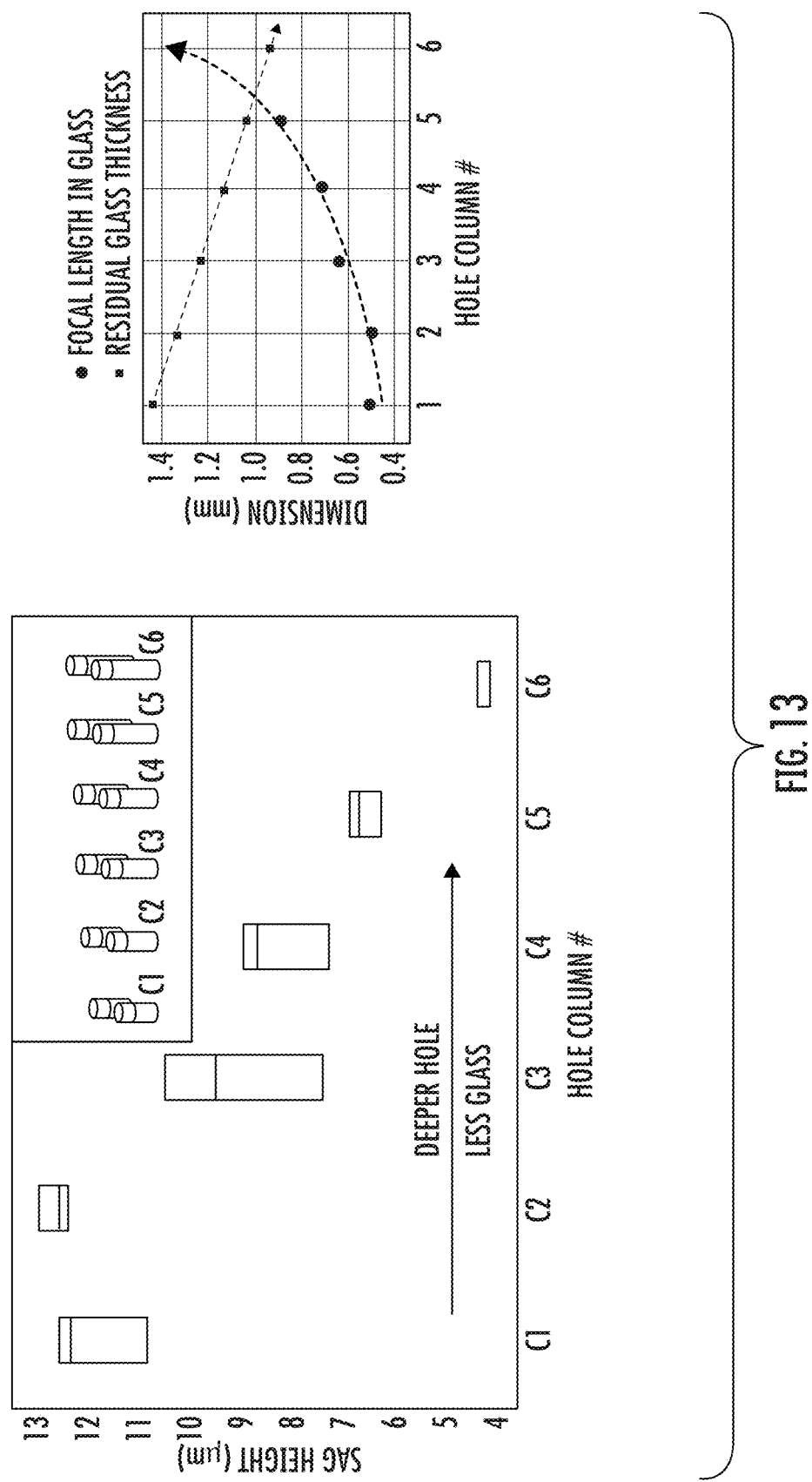

FIGS. 12 and 13 show corresponding focal length data for lenses 118. In particular, FIG. 12 shows focal length (in microns) as a function of hole depth as defined in Table 1 above. As shown in Table 1, shallower Holes 1 and 2 have the highest lens heights. Referring briefly to FIG. 13, the right graph shows the same focal length data shown in FIG. 12. The graph also shows the residual glass thickness data shown in Table 1. As shown, the trend lines intersect at about 1 mm. The intersection of the trend lines indicates that at a residual glass thickness of about 1 mm, light emitted through the fiber and corresponding lens will be collimated. As used herein, "residual glass" refers to the glass thickness of ferrule 102 that has not been drilled. Stated another way, "residual glass" refers to a thickness of the untreated glass 116 of ferrule 102.

Referring to the left graph of FIG. 13, a plot of the sag height data of Table 1 is shown. As shown, as the depth of hole 102A in ferrule 102 increased, the sag height of corresponding lens decreased. Without wishing to be held to any particular theory, it is believed that greater depth of hole 102A leaves less glass of ferrule 102 to make lens 118, and therefore, the sag height of lens 118 is reduced. As used herein, "sag height" refers to the distance from the apex of lens 118 to the surface onto which lens 118 is applied (i.e., onto second surface 101).

There are many other alternatives and variations that will be appreciated by persons skilled in optical connectivity without departing from the spirit or scope of this disclosure. For at least this reason, the invention should be construed to include everything within the scope of the appended claims and their equivalents.

What is claimed is:

1. A method of making a lensed connector comprising:
inserting a light occluding agent into at least one hole of a ferrule made of glass, wherein the at least one hole extends partially through the ferrule from a first surface;
applying UV light onto the first surface of the ferrule such that the light occluding agent prevents a portion of the ferrule from being treated by the UV light, thereby forming an untreated portion of the ferrule;
removing the light occluding agent from the ferrule; and
thermally developing the ferrule such that the untreated portion of the ferrule forms a dome shaped lens structure protruding from a second surface of the ferrule, wherein the second surface is opposite the first surface.

2. The method of claim 1, further including:
inserting an optical fiber into the at least one hole; and
bonding the optical fiber to the lens structure within the at least one hole with an adhesive.

3. The method of claim 2, wherein the hole is substantially circular in shape having a center and an outer surface with at least one protuberance, wherein the at least one protuberance extends radially inward towards the center by a distance between 1 μm and 100 μm.

4. The method of claim 3, wherein the distance defines a gap through which the adhesive can flow and exit the at least one hole.

5. The method of claim 1, wherein the hole extends into between 25% and 80% of a thickness of the ferrule.

6. The method of claim 1, wherein the dome shaped lens structure has a sag height ranging between 4.5 μm and 13 μm.

7. The method of claim 1, wherein the UV light has a wavelength ranging between 300 nm and 340 nm.

8. The method of claim 1, wherein the glass ferrule comprises a photosensitive glass.

9. The method of claim 8, wherein during the thermally developing, the untreated portion of the ferrule softens and the photosensitive glass of the ferrule surrounding the untreated portion shrinks in volume to squeeze the untreated portion and form the dome shaped lens structure.

10. The method of claim 1, wherein the at least one hole comprises a plurality of holes arranged in an array, wherein the array of the plurality of holes is two-dimensional and rectangular with between 2 and 8 rows and between 6 and 24 columns.

11. The method of claim 10, wherein the array of the plurality of holes is two-dimensional and rectangular with at least 96 holes.

12. The method of claim 1, wherein thermally developing the ferrule comprises subjecting the ferrule to a temperature ranging between 500° C. and 600° C. and for a time period between 0.5 hours and 2 hours.

* * * * *